United States Patent [19]
Finch et al.

[11] Patent Number: 4,534,222
[45] Date of Patent: Aug. 13, 1985

[54] FIBER-OPTIC SEISMIC SENSOR

[75] Inventors: George W. Finch, Malibu; Eric Udd, Huntington Beach, both of Calif.

[73] Assignee: McDonnell Douglas Corporation, Long Beach, Calif.

[21] Appl. No.: 521,001

[22] Filed: Aug. 8, 1983

[51] Int. Cl.³ .................. G01H 1/00; G01V 1/16
[52] U.S. Cl. .................. 73/653; 73/657; 250/227; 356/345
[58] Field of Search .......... 73/657, 655, 653, 652, 73/517 R; 356/345, 356; 367/149; 250/227

[56] References Cited

U.S. PATENT DOCUMENTS

| | | | |
|---|---|---|---|
| 4,114,453 | 9/1978 | Sandler | 73/517 R |
| 4,162,397 | 7/1979 | Bucaro et al. | 73/655 |
| 4,193,130 | 3/1980 | Young et al. | 367/149 |
| 4,297,887 | 11/1981 | Bucaro | 73/655 |
| 4,363,114 | 12/1982 | Bucaro et al. | 73/657 |
| 4,408,495 | 10/1983 | Couch et al. | 73/655 |
| 4,442,350 | 4/1984 | Rashleigh | 73/657 |

OTHER PUBLICATIONS

Kersey, A. D. et al., "High-Sensitivity Fibre-Optic Accelerometer", *Electronics Letters*, vol. 18, No. 13, Jun. 1982, pp. 559–561.

*Primary Examiner*—Stewart J. Levy
*Assistant Examiner*—John E. Chapman, Jr.
*Attorney, Agent, or Firm*—George W. Finch; Donald L. Royer; John P. Scholl

[57] ABSTRACT

A vibration sensor is constructed by providing two preferably matched coils of fiber-optic material. When the sensor experiences vibration, a differential pressure is exerted on the two fiber coils. The differential pressure results in a variation in the relative optical path lengths between the two fibers so that light beams transmitted through the two fibers are differently delayed, the phase difference therebetween being a detectable indication of the vibration applied to the sensor.

17 Claims, 6 Drawing Figures

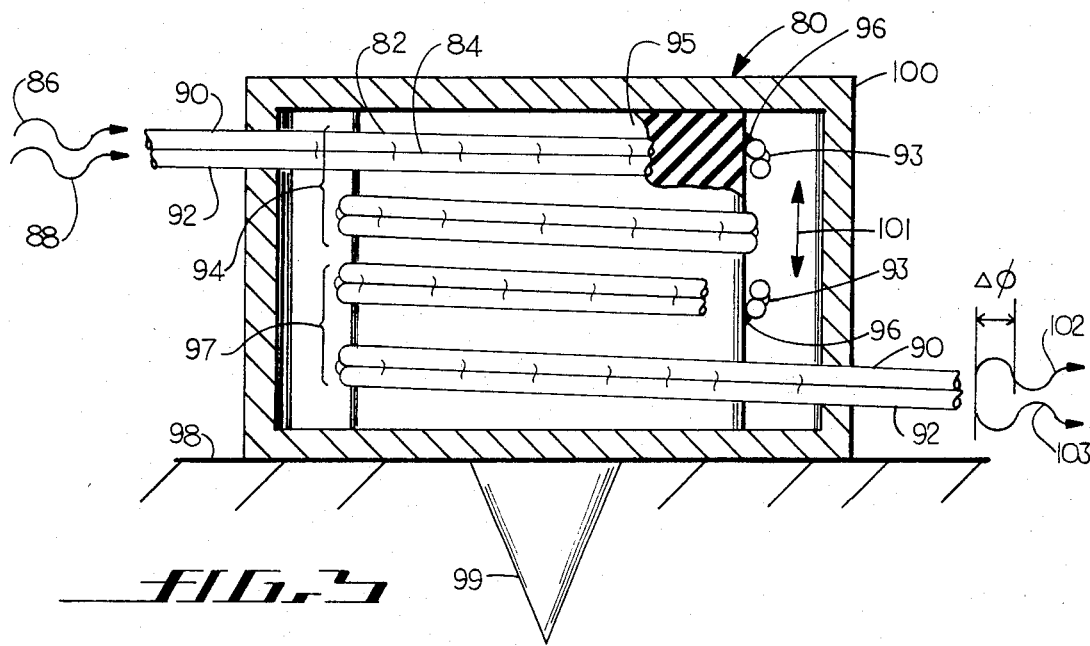
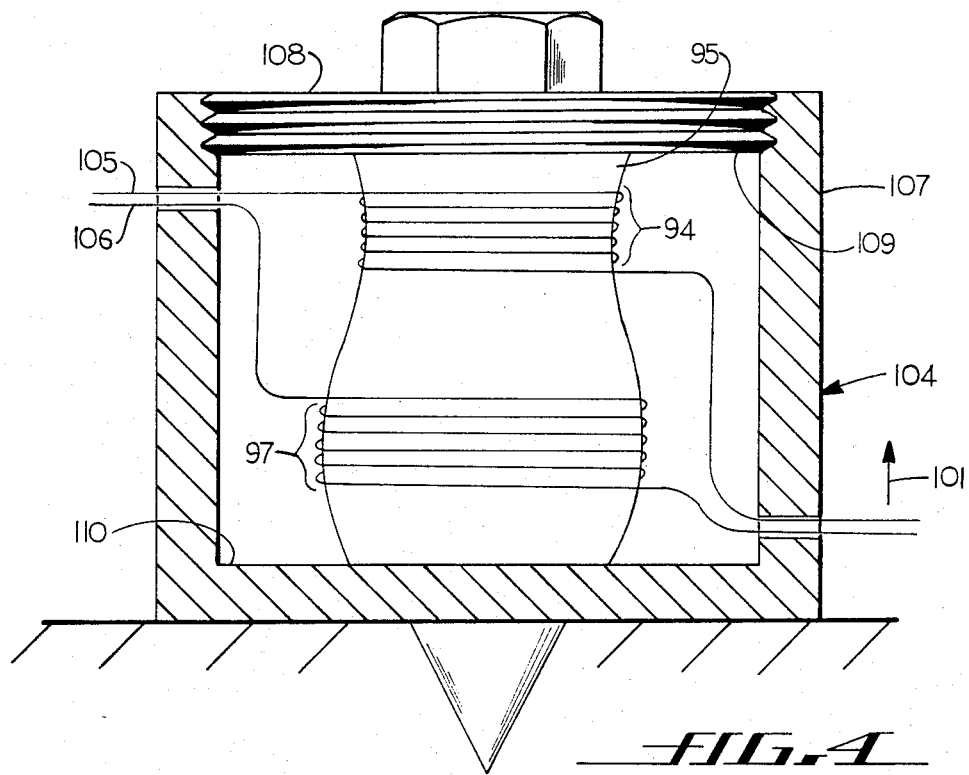

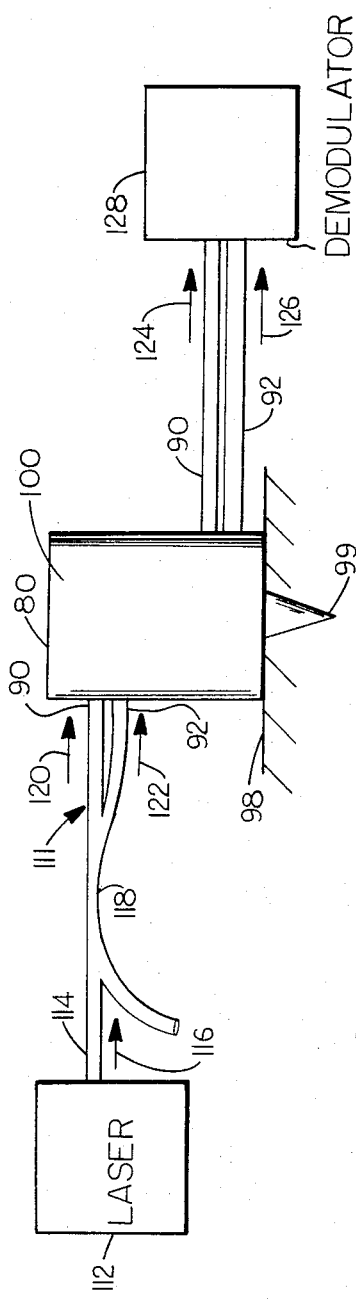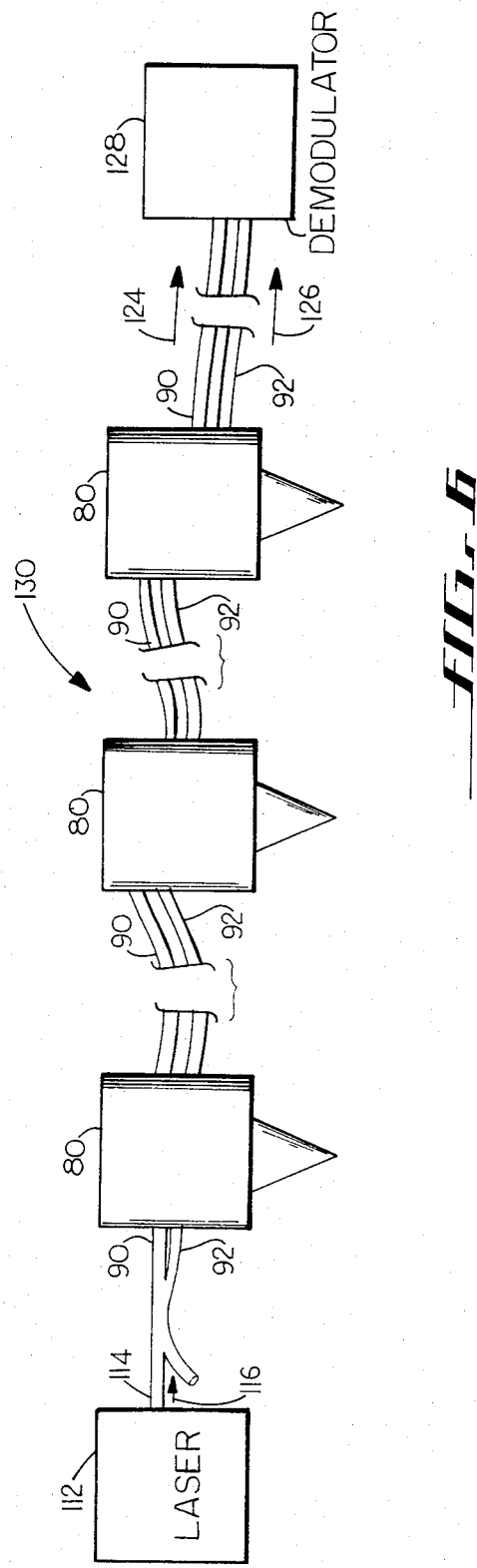

FIBER-OPTIC SEISMIC SENSOR

BACKGROUND OF THE INVENTION

Vibration sensors, especially those used for detecting seismic vibrations, must be tolerant of extreme environmental conditions since typically they receive very rough handling, yet at the same time, must be sensitive to faint movements of the ground. Heretofore, seismic sensors have tended to be electrical in nature. That is, they produce an electrical signal indicative of the seismic vibration. When such sensors are used in large arrays, these electrical signals must be very carefully shielded or the entire array acts as an antenna for electrical noise which disrupts the effective reduction of the data obtained.

BRIEF DESCRIPTION OF THE PRESENT INVENTION

In the present invention a Mach-Zender fiber-interferometer is constructed with an extremely rugged sensor head. In the interferometer, a light beam is split and transmitted down two optical fibers. In one version, portions of the fibers are coiled on the opposite sides of a mass and supported within a sealed container in a pressure transmitting medium, such as, RTV. By coupling the sensor head to the source of vibration wished to be sensed, the head with the fiber coils moves while the mass therebetween tends to remain stationary. This applies differential pressures to the coils which results in variations in the relative optical path lengths between the two fibers. The beams are then recombined and detected with the phase difference variations between the beams being an indication of the applied vibration. In another version, the coils are wrapped together around an elastic mandril with one coil more intimately coupled to the mandril than the other to introduce variations in the relative optical path lengths between the two coils.

Since light, rather than electricity is used as the sensing medium, the present invention is relatively immune to electromagnetic interference. Also, the sensor head can be very light weight in design so it is easily coupled into vibrations of the earth. It is potentially very low cost due to its simple construction which requires no particularly sophisticated components.

Therefore it is an object of the present invention to provide a vibration sensor particularly suited for seismic sensing.

Another object is to provide a seismic sensor which can be constructed easily in relatively simple manufacturing facilities and at low cost.

Another object is to provide a seismic sensor which is capable of withstanding extreme G-loading during transportation and placement and yet is sensitive to the slight vibrations normally of interest in seismic investigations.

These and other objects and advantages of the present invention will become apparent to those skilled in the art after considering the following detailed specification along with the accompanying drawings wherein:

BRIEF DESCRIPTION OF THE DRAWINGS

FIG. 3 is a diagrammatic representation of an alternative sensor head constructed according to the present invention;

FIG. 4 is a diagrammatic representation of another alternative sensor head constructed according to the present invention;

FIG. 5 is a diagrammatic representation of an alternate vibration sensing system employing the vibration sensor heads of FIGS. 1, 3 or 4; and FIG. 6 is a diagrammatic representation of an alternate vibration sensing system employing the vibration sensor heads of FIGS. 1, 3 or 4 in series.

DETAILED DESCRIPTION OF THE SHOWN EMBODIMENTS

Figure 1:
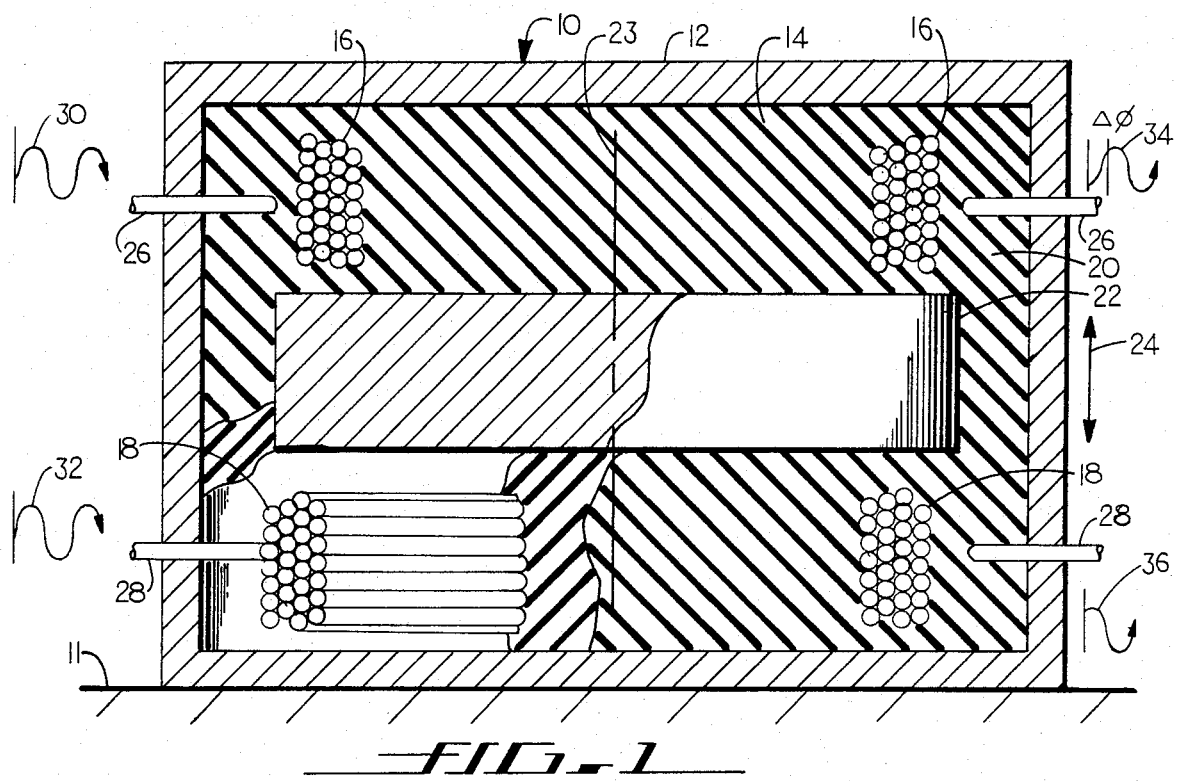
FIG. 1 is a partial cross-sectional view of an idealized sensor head constructed according to the present invention.

Referring to the drawings more particularly by reference numbers, number 10 in FIG. 1 refers to a vibration sensor head constructed according to the present invention. The head 10 is shown coupled to the ground 11 so that vibrations of the ground 11 cause the head 10 to vibrate. The head 10 includes an enclosed body 12 defining a cavity 14. Within the cavity 14, two coils 16 and 18 of single mode optical fiber are placed in suitable potting compound 20 on either side of a mass 22 held centrally therebetween by the potting compound 20, the coils 16 and 18 and the mass 20 having a common axis 23. The springyness and damping qualities of the potting compound 20 are chosen for the range of vibrations to be applied to the sensor head 10 so that movement thereof in the direction of the arrow 24 allows relative movement between the mass 22 and the two coils 16 and 18. Therefore, when the sensor head 10 experiences a vibration, differential pressures are exerted on the two fiber coils 16 and 18 due to the relative motion of the central mass. The differential pressures result in variations in the relative optical path lengths of the fibers 26 and 28 from which the coil 16 and 18 are constructed. When light beams 30 and 32 having a predetermined phase relationship are passed through the coils 16 and 18, these changes in optical path length produce a varying phase difference $\Delta\phi$ in the output beams 34 and 36 exiting the coils 16 and 18 which is detectable to indicate the vibration applied to the head 10.

Figure 2:
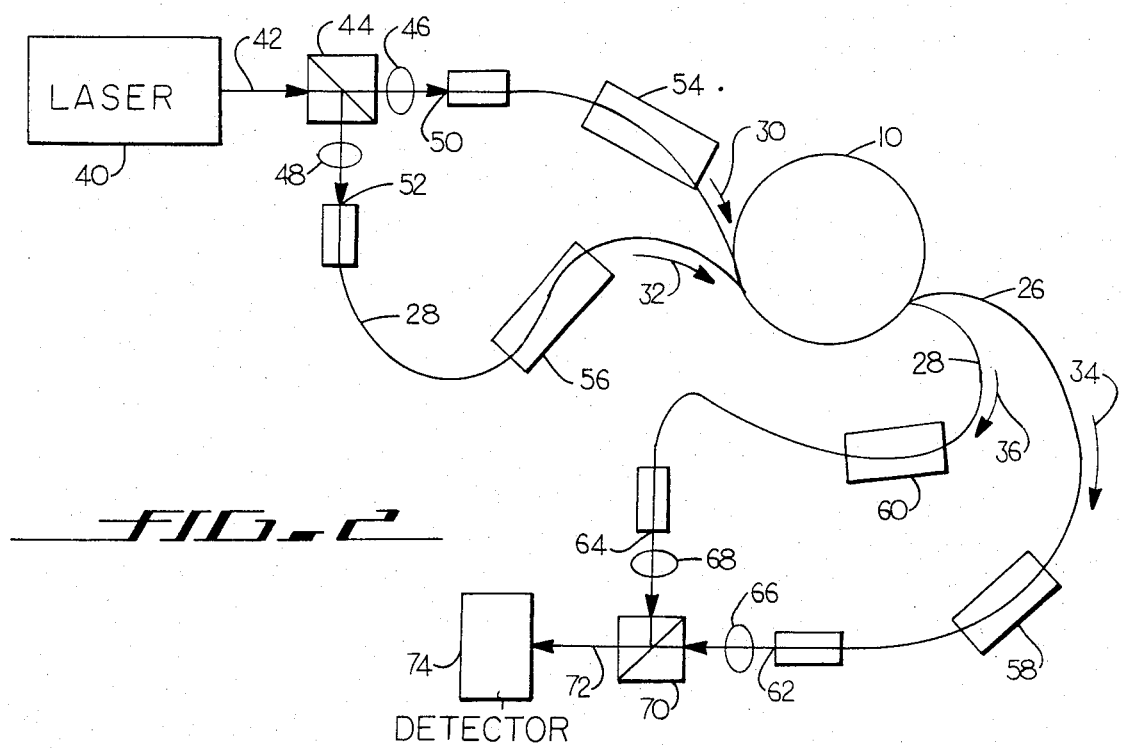
FIG. 2 is a diagrammatic representation of a vibration sensing system employing the vibration sensor of FIG. 1.

As shown in FIG. 2, the beams 30 and 32 are produced by a suitable light source 40, such as a laser, whose output beam 42 is split by a beamsplitter 44 and the focused by lenses 46 and 48 onto the ends 52 and 52 of the fibers 26 and 28 to form the beams 30 and 32. After the beams 30 and 32 enter the fibers 26 and 28, they each pass through a mode stripping region 54 and 56 that eliminates cladding modes prior to entry into the sensor head 10. This mode stripping region maybe a fiber with an appropriately indexed matched jacket. After the input beams 30 and 32 are impressed with relative phase changes by an applied vibrational signal within the sensor head 10, the output beams 34 and 36 pass through mode stripping regions 58 and 60 to assure that cladding modes induced during vibration do not interfere with the output beams 34 and 36.

The beams 34 and 36 pass out the ends 62 and 64 of the fibers 26 and 28 and are recollimated by lenses 66 and 68 into a beamsplitter 70 which recombines them into an output beam 72. The output beam 72 varies in intensity in accordance with the relative phase of the output beams 34 and 36. The combined output beam 72 is projected onto a detector 74 where its intensity is sensed and converted into an electrical signal for further processing. The fibers 26 and 28 may be extremely long so that the detector 74 is located in an environment where electromagnetic interference is no concern.

FIG. 3 shows an embodiment 80 that allows the sensing coils 82 and 84 to be placed in close proximity to each other to reduce the effect on the sensor head 80 due to external environmental influences such as thermal fluctuations. Input light beams 86 and 88 enter the sensing fibers 90 and 92 of the coils 82 and 84 respectively. The fibers 90 and 92 may be thermally connected to reduce extraneous signals. For example, a thermally conductive, flexible potting compound or thermal grease 93 may be used. One of the sensing fibers 90 is wound tightly about or bonded to the upper portion 94 of an elastic cylindrical mandril 95 and attached thereto such as with adhesive 96 while the other fiber 92 is not constrained to move with any deformation of the upper portion 94 of the mandril 95. In particular, care is taken so that the fiber 92 can slip relative to the fiber 90 at the upper portion 94. This arrangment is reversed at the lower portion 97 of the mandril 95 where the fiber 92 is wound tightly or bonded to the mandril 95 and the fiber 90 is decoupled therefrom. Upon motion of the surface 98 to which the sensor head 80 is attached by means of a spike 99 or adhesive not shown, the case 100 of the sensor head 80 follows the motion of the surface 98. The resultant actuation in the directions of arrow 101 causes the elastic mandril 95 to be deformed, varying the relative optical path lengths between the sensing fibers 90 and 92 and resulting in a variation of the relative phase $\Delta\phi$ between the output beams 102 and 103 exiting the fibers 90 and 92.

The motion of the mandril 95 in greatly exaggerated form is shown in FIG. 4 in another sensor head embodiment 104. This exaggeration can be imagined by understanding that the mandril 95 may be constructed from materials such as rubber or steel. The sensor head 104 employs sensing fibers 105 and 106 which are essentially the same length but fiber 105 is positioned and tightly wrapped about only the upper portion 94 of the mandril 95 while fiber 106 is positioned and wrapped tightly about only the lower portion 97 thereof. Since the fibers 105 and 106 cannot be thermaly connected in this configuration, a thicker, more thermally protective case 107 is provided. A threaded plug 108 allows access into the case 107 for installation of the mandril 95. The plug 108 includes an abutment surface 109 parallel to the bottom inner surface 110 of the case which surfaces 109 and 110 are both perpendicular to the direction of motion to be sensed (arrow 101). It is preferable that the surfaces 109 and 110 are spaced to cause a slight compression of the mandril 95 to prevent non-linear effects during high levels of vibration. The mandril 95 also may be bonded to the surfaces 109 and 110.

FIG. 5 illustrates an alternative sensor system 111 to that shown in FIG. 2. A laser diode 112 is pigtailed to the input fiber 114 so that an input light beam 116 is coupled into the system 111. This light beam 116 is coupled by the input fiber 114 into a fiber beamsplitter 118 which splits the input light beam 116 into input beams 120 and 122. The beams 120 and 122 are coupled into the input fibers 90 and 92 respectively of the sensor head 80 and are modulated in phase relative to each other by movement of the mandril 95 of the sensor head 80 to produce output light beams 124 and 126. The beams 124 and 126 are then conveyed by the fibers 90 and 92 to a suitable optical demodulator 128 that extracts the phase information $\Delta\phi$ between the light beams 124 and 126.

The sensor heads 10, 80 and 104 may be used interchangeably with the systems of FIGS. 2 and 5. It is also possible to use the sensors 10, 80 and 104 in a system 130 having series strings as is shown in FIG. 6. In this case the effect of the several sensor heads 10, 80 or 104 is cumulative so that the relative phase difference $\Delta\phi$ between the output light beams 124 and 126 is the sum of the action of each of the sensor heads 10, 80 and 104.

Therefore there has been shown and described a novel fiber-optic vibration sensor which fulfills all the objects and advantages sought therefore. Many changes, modifications, variations and other uses and applications of the subject invention will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A vibration sensor including:
   a first optical fiber having:
     an input end;
     an output end; and
     a coil portion therebetween of a first predetermined optical path length when said sensor is not subject to vibration to be sensed;
   a second optical fiber having:
     an input end;
     an output end; and
     a coil portion therebetween of a second predetermined optical path length when said sensor is not subject to vibration to be sensed;
   a closed body adapted to be coupled to the vibration to be sensed to vibrate said body, said coil portions of said first and second optical fibers being positioned within said body; and
   means to vary said optical path length of at least said first optical fiber coil portion with the vibration of said body including:
     a mass having:
       a first side; and
       a second opposite side, said first and second sides being orientated generally at right angles to the vibration to be sensed; and
     elastic means to fill said body and encapsulate said coil portions of said first and second optical fibers and said mass within said body, said mass being positioned between said coil portion of said first optical fiber and said coil portion of said second optical fiber, whereby movement of said mass within said body caused by vibration of said body causes said elastic means to exert differential pressures between said coil portions of said first and second optical fibers.

2. The vibration sensor as defined in claim 1 wherein said elastic means is potting compound.

3. The vibration sensor as defined in claim 2 wherein said potting compound is RTV rubber.

4. The vibration sensor as defined in claim 1 wherein said mass includes:
   a cylindrical edge surface between said first and second sides, said first side facing said coil portion of said first optical fiber and said second side facing said coil portion of said second optical fiber.

5. The vibration sensor as defined in claim 4 wherein said coil portion of said first fiber has an axis of revolution orientated generally perpendicular to said first side of said mass.

6. The vibration sensor as defined in claim 1 wherein said first and second optical fibers are single mode optical fibers.

7. The vibration sensor as defined in claim 6 wherein said first predetermined optical path length and said second predetermined optical path length are essentially the same.

8. The vibration sensor as defined in claim 7 wherein said coil portions of said first and second optical fibers are essentially identical.

9. A vibration sensor including:
a first optical fiber having:
  an input end;
  an output end; and
  a coil portion therebetween of a first predetermined optical path length when said sensor is not subject to vibration to be sensed;
a second optical fiber having:
  an input end;
  an output end; and
  a coil portion therebetween of a second predetermined optical path length when said sensor is not subject to vibration to be sensed;
a body adapted to be coupled to the vibration to be sensed to vibrate said body, said coil portions of said first and second optical fibers being positioned within said body, said body including:
  first and second, generally parallel, facing inner surfaces; and
means to vary said optical path length of at least said first optical fiber coil portion with the vibration of said body including:
  a generally cylindrical elastic mandril having:
    first and second end surfaces;
    a cylindrical surface positioned therebetween, said first and second end surfaces being positioned adjacent said first and second inner surfaces of said body to couple the vibration to be sensed into said mandril, said first and second optical fiber coil portions being wrapped about said mandril cylindrical surface, said mandril cylindrical surface including:
      a first cylindrical portion positioned adjacent said first end surface; and
      a second cylindrical portion positioned adjacent said second end surface; and
    means to couple said first optical fiber coil portion to expansion and contraction of said cylindrical surface, said first optical fiber coil portion including:
      a first coil part; and
      a second coil part, said first coil part of said first optical fiber coil portion being tightly wrapped to said first cylindrical portion to couple said first optical fiber coil portion to expansion and contraction of said cylindrical surface, said second optical fiber coil portion including:
        a first coil part; and
        a second coil part, said second coil part of said second optical fiber coil portion being tightly wrapped to said second cylindrical portion to couple second optical fiber coil portion to expansion and contraction of said cylindrical surface.

10. The vibration sensor as defined in claim 9 wherein said first coil part of said second optical fiber coil portion is loosely wrapped about said first cylindrical portion and said second coil part of said first optical fiber coil portion is loosely wrapped about said second cylindrical portion.

11. A vibration sensor including:
a first optical fiber having:
  an input end;
  an output end; and
  a coil portion therebetween of a first predetermined optical path length when said sensor is not subject to vibration to be sensed;
a second optical fiber having:
  an input end;
  an output end; and
  a coil portion therebetween of a second predetermined optical path length when said sensor is not subject to vibration to be sensed;
a body adapted to be coupled to the vibration to be sensed to vibrate said body, said coil portions of said first and second optical fibers being positioned within said body, said body including:
  first and second, generally parallel, facing inner surfaces; and
means to vary said optical path length of at least said first optical fiber coil portion with the vibration of said body including:
  a generally cylindrical elastic mandril having:
    first and second end surfaces;
    a cylindrical surface positioned therebetween including:
      a first cylindrical portion positioned adjacent said first end surface; and
      a second cylindrical portion positioned adjacent said second end surface, said first and second end surfaces being positioned adjacent said first and second inner surfaces of said body to couple the vibration to be sensed into said mandril, said first and second optical fiber coil portions being wrapped about said mandril cylindrical surface; and
    means to couple said first optical fiber coil portion to expansion and contraction of said cylindrical surface, said first optical fiber coil portion including:
      a first coil part; and
      a second coil part, said first coil part of said first optical fiber coil portion being wrapped about and physically coupled to said first cylindrical portion to couple said first optical fiber coil portion to expansion and contraction of said cylindrical surface, and said second optical fiber coil portion including:
        a first coil part; and
        a second coil part, said second coil part of said second optical fiber coil portion being wrapped about and physically coupled to said second cylindrical portion to couple said second optical fiber coil portion to expansion and contraction of said cylindrical surface.

12. The vibration sensor as defined in claim 11 wherein said first coil part of said second optical fiber coil portion is wrapped about and physically decoupled from said first cylindrical portion and said second coil part of said first optical fiber coil portion is wrapped about and physically decoupled from said second cylindrical portion.

13. The vibration sensor as defined in claim 12 wherein said first coil part of said first optical fiber coil portion and said second coil part of said second optical fiber coil portion are coupled to said cylindrical surface by being bonded thereto.

14. The vibration sensor as defined in claim 13 where said first and second optical fiber coil portions are helically wrapped together about said mandril cylindrical surface.

15. A vibration sensor including:
a first optical fiber having:
 an input end;
 an output end; and
 a coil portion therebetween of a first predetermined optical path length when said sensor is not subject to vibration to be sensed;
a second optical fiber having:
 an input end;
 an output end; and
 a coil portion therebetween of a second predetermined optical path length when said sensor is not subject to vibration to be sensed;
a body adapted to be coupled to the vibration to be sensed to vibrate said body, said coil portions of said first and second optical fibers being positioned within said body, said body including:
 first and second, generally parallel, facing inner surfaces; and
means to vary said optical path length of at least said first optical fiber coil portion with the vibration of said body including:
 a generally cylindrical elastic mandril having:
  first and second end surfaces;
  a cylindrical surface positioned therebetween including:
   a first cylindrical portion positioned adjacent said first end surface; and
   a second cylindrical portion positioned adjacent said second end surface, said first and second end surfaces being positioned adjacent said first and second inner surfaces of said body to couple the vibration to be sensed into said mandril, said first and second optical fiber coil portions being wrapped about said mandril cylindrical surface, and
 means to couple said first optical fiber coil portion to expansion and contraction of said cylindrical surface including:
  said first optical fiber coil portion being wrapped about and physically coupled to said first cylindrical portion to couple said first optical fiber coil portion to expansion and contraction of said cylindrical surface and being physically isolated from said second cylindrical portion; and
  said second optical fiber coil portion being wrapped about and physically coupled to said second cylindrical portion to couple said second optical fiber coil portion to expansion and contraction of said cylindrical surface and being physically isolated from said first cylindrical portion.

16. The vibration sensor as defined in claim 15 wherein said first optical fiber coil portion is wrapped about said second cylindrical portion and said second optical fiber coil portion is wrapped about said first cylindrical portion.

17. The vibration sensor as defined in claim 16 including:
means for thermal communicating said first and second optical fiber coil portions with each other and acoustically isolating said first and second optical fiber coil portions from each other.

* * * * *